United States Patent
Funabashi

[19]

[11] Patent Number: 5,883,991

[45] Date of Patent: Mar. 16, 1999

[54] OPTICAL WAVEGUIDE CIRCULATOR

[75] Inventor: Masaaki Funabashi, Tokyo, Japan

[73] Assignee: NEC Corporation, Japan

[21] Appl. No.: 868,441

[22] Filed: Jun. 3, 1997

[30] Foreign Application Priority Data

Jun. 4, 1996 [JP] Japan ................................. 8-141383

[51] Int. Cl.⁶ ............................... G02B 6/10; G02B 6/26
[52] U.S. Cl. ............................. 385/39; 385/27; 385/32; 385/45; 385/46
[58] Field of Search ................................. 385/27, 32, 50, 385/15, 24, 39, 49, 45, 46

[56] References Cited

U.S. PATENT DOCUMENTS

| | | | |
|---|---|---|---|
| 4,378,951 | 4/1983 | Nago | 350/96.15 |
| 4,482,202 | 11/1984 | Nagao | 350/96.15 |
| 4,859,014 | 8/1989 | Schmitt et al. | 350/96.13 |
| 4,978,189 | 12/1990 | Blonder et al. | 350/96.12 |
| 5,018,814 | 5/1991 | Jannson et al. | 350/96.15 |
| 5,400,418 | 3/1995 | Pearson et al. | 385/11 |
| 5,574,596 | 11/1996 | Cheng | 359/484 |

OTHER PUBLICATIONS

"Verification of Waveguide–Type Optical Circulator Operation", Electronics Letters, vol. 26, No. 3, pp. 199–200, Feb. 1990.

*Primary Examiner*—John D. Lee
*Assistant Examiner*—Victoria D. Hao
*Attorney, Agent, or Firm*—Ostrolenk, Faber, Gerb & Soffen, LLP

[57] ABSTRACT

There are provided a first optical waveguide having a first curved portion, a second optical waveguide having a second curved portion that extends along and is disposed inside the first curved portion, a third optical waveguide having a third curved portion, an end portion of the third curved portion being connected to both end portions of the first and second curved portions. Further provided are light output means disposed at an end portion of the first optical waveguide which is opposite the end portion of the first curved portion, for receiving light outputted from the first optical waveguide, light input means disposed at an end portion of the second optical waveguide which is opposite the end portion of the second curved portion, for introducing light into the second optical waveguide, light input/output means disposed at an end portion of the third optical waveguide which is opposite to the end portion of the third curved portion, for introducing light into the third optical waveguide and for receiving light outputted from the third optical waveguide. This optical waveguide circulator is suitable for miniaturization and is also suitable for mass production because it does not require any expensive individual parts.

8 Claims, 6 Drawing Sheets

OPTICAL WAVEGUIDE CIRCULATOR

BACKGROUND OF THE INVENTION

1. Field of the Invention

The present invention relates to an optical circulator used for optical communication and, more particularly, to an optical waveguide circulator.

2. Description of the Related Art

The optical circulator is an optical device having at least three optical input/output ports A, B, and C and provided with a function that, for instance, light incident on port A is allowed to exit from port B and light incident on port B is allowed to exit from port C, but light is prohibited from passing through the device in the opposite direction.

Conventionally, as shown in FIGS. 1 and 2, an optical circulator is generally constructed by bulk components such as polarizing beam splitters 12, Faraday rotators 10, wave plates 11, and prisms 13.

As shown in FIG. 1, light inputted to port 14 (port B) is separated by the polarizing beam splitter 12, and resulting beams are rotated in polarization plane by 45° in passing through the Faraday rotators 10. Resulting 45°-rotated beams are rotated by 45° in the opposite direction by the wave plates 11, then combined by the other polarizing beam splitter 12, and outputted from port 15 (port C).

On the other hand, as shown in FIG. 2, light inputted to port 16 (port A) is separated by the polarizing beam splitter 12, and separated beams are rotated in polarization plane by 45° in passing through the wave plates 11. Resulting 45°-rotated beams are further rotated by 45° in the same direction by the Faraday rotators 10, then combined by the other polarizing beam splitter 12, and outputted from port 14 (port B).

In the above bulk-type optical circulator, each of the polarizing beam splitters 12, the Faraday rotators 10, and the wave plates 11 is made of quartz glass or a magnet, for instance. In assembling those optical elements, to efficiently guide incident light to an output end, care should be taken not to cause deviations from the optical axis.

FIG. 3 shows another optical circulator which is configured differently from the above one. That is, the optical circulator is configured by two optical isolators and one Y branching device connected to the former.

Constructed as an assembly of a plurality of optical elements, the conventional bulk-type optical circulator necessarily has a limit in its miniaturization. In addition to limitations due to sizes of the optical elements themselves, there are other factors of preventing the miniaturization as exemplified by the facts that such operations as polishing and bonding of glass members are needed to produce a polarizing beam splitter, and that optical elements need to be assembled with each other.

The optical circulator of FIG. 3 also has a limit in miniaturization because the individual parts, i.e., the isolators and the Y branching deice, are large and a certain space is needed for reinforcement after the parts are connected together.

The conventional optical circulators have another problem that the individual optical elements are expensive. For example, each of such optical elements as a polarizing beam splitter, a wave plate, and a Faraday rotator is expensive and hence prevents price reduction. Also in the configuration with fusion splice of the parts, the parts, i.e., the isolators and the Y branching device, are expensive and the cost of fusion splice is high.

Further, requiring assembly of optical parts with high accuracy, the conventional optical circulators has a limit in mass productivity even with automated assembly using robots or the like. Also in the configuration with fusion splice of the parts, the parts are connected together such that optical fibers are fusion-spliced manually one by one and hence there is no likelihood of substantial improvement in mass productivity.

Still further, when a conventional circulator is used in combination with a passive device, it is unavoidable to manually fusion-splice optical fibers of the optical circulator and the passive device one by one and hence the manufacture takes long time.

SUMMARY OF THE INVENTION

An object of the present invention is to solve the above problems of the conventional optical circulators, to thereby provide an optical circulator that is small and high in productivity.

To solve the above problems of the conventional optical circulators, according to the invention, there is provided an optical waveguide circulator comprising a first optical waveguide having a first curved portion a second optical waveguide having a second curved portion that extends along and is disposed inside the first curved portion; a third optical waveguide having a third curved portion, an end portion of the third curved portion being connected to both end portions of the first and second curved portions; light output means disposed at an end portion of the first optical waveguide which is opposite the end portion of the first curved portion, for receiving light outputted from the first optical waveguide; light input terminal disposed at an end portion of the second optical waveguide which is opposite the end portion of the second curved portion, for introducing light into the second optical waveguide; light input/output means disposed at an end portion of the third optical waveguide which is opposite to the end portion of the third curved portion, for introducing light into the third optical waveguide and for receiving light outputted from the third optical waveguide. The first, second, and third optical waveguides are disposed on the same substrate. The first and third curved portions are curved to the same side.

The first, second, and third optical waveguides can be formed as silicon oxide waveguides by using a silicon substrate.

The optical waveguide circulator of the invention may further comprise an optical filter, which is a grating formed in the third optical waveguide.

The optical waveguide circulator of the invention may further comprise a dispersion compensator, which includes gratings formed in the third optical waveguide.

BRIEF DESCRIPTION OF THE DRAWINGS

The above and other objects, features, and advantages of the present invention will become more apparent from the following detailed description when taken in conjunction with the accompanying drawings wherein.

DETAILED DESCRIPTION OF THE PREFERRED EMBODIMENTS

An optical waveguide circulator according to the invention will be hereinafter described. Before describing a specific configuration of an optical waveguide circulator according to an embodiment of the invention, its principle of operation will be described.

Figure 1:
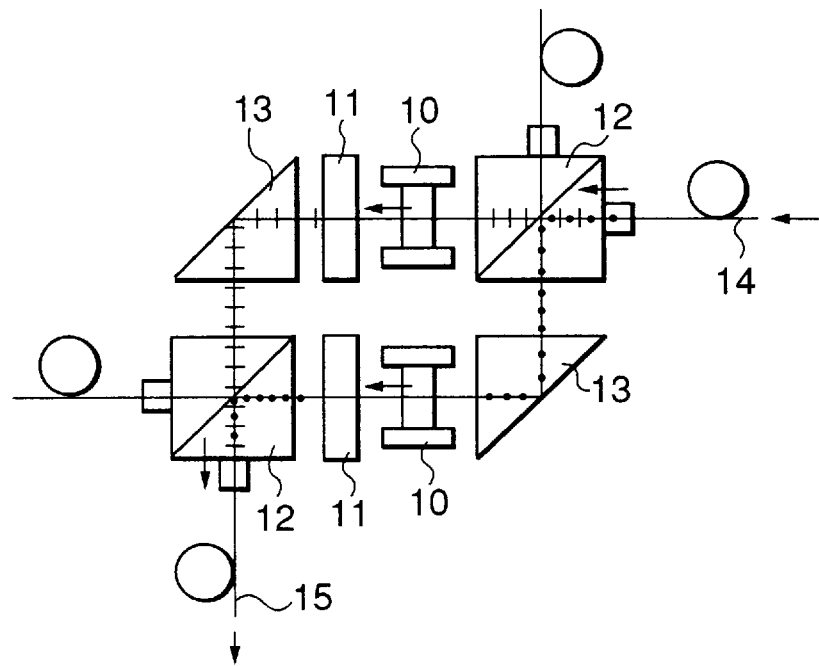
FIGS. 1 and 2 show the configuration of a conventional optical circulator.
Figure 2:
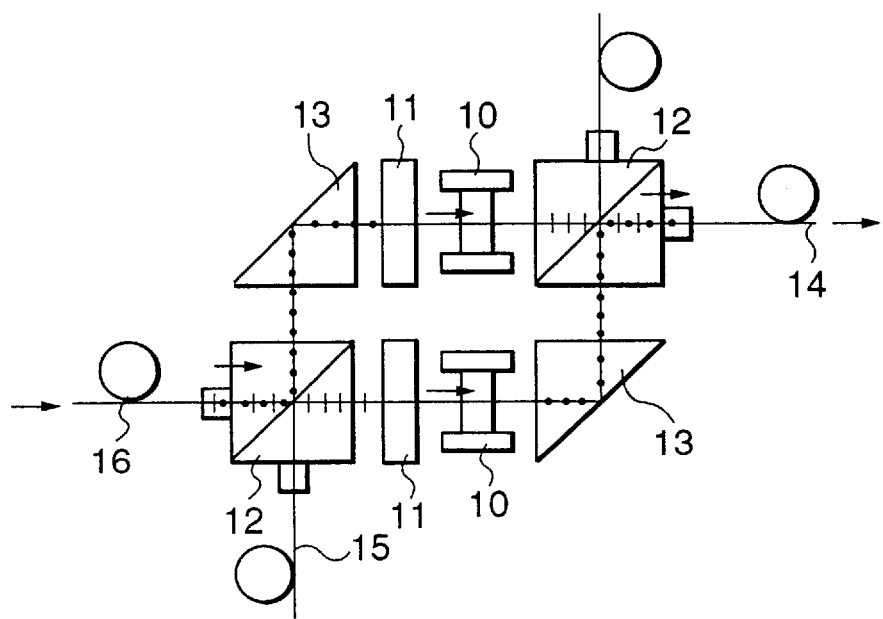
Figure 3:
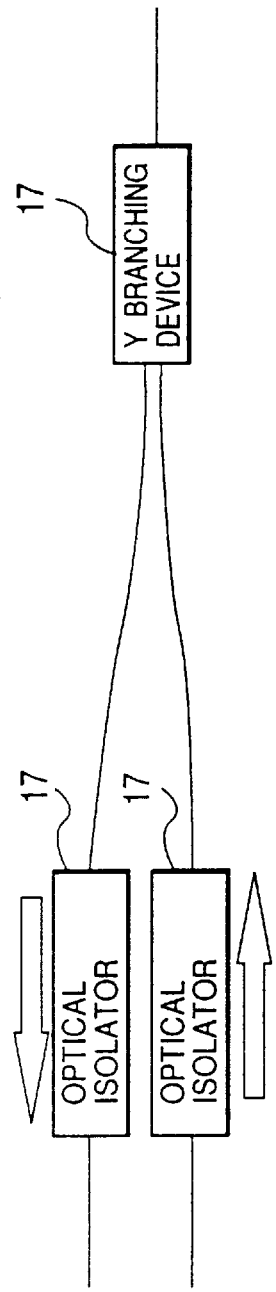
FIG. 3 shows the configuration of another optical circulator in which parts are fusion-spliced.
Figure 4:
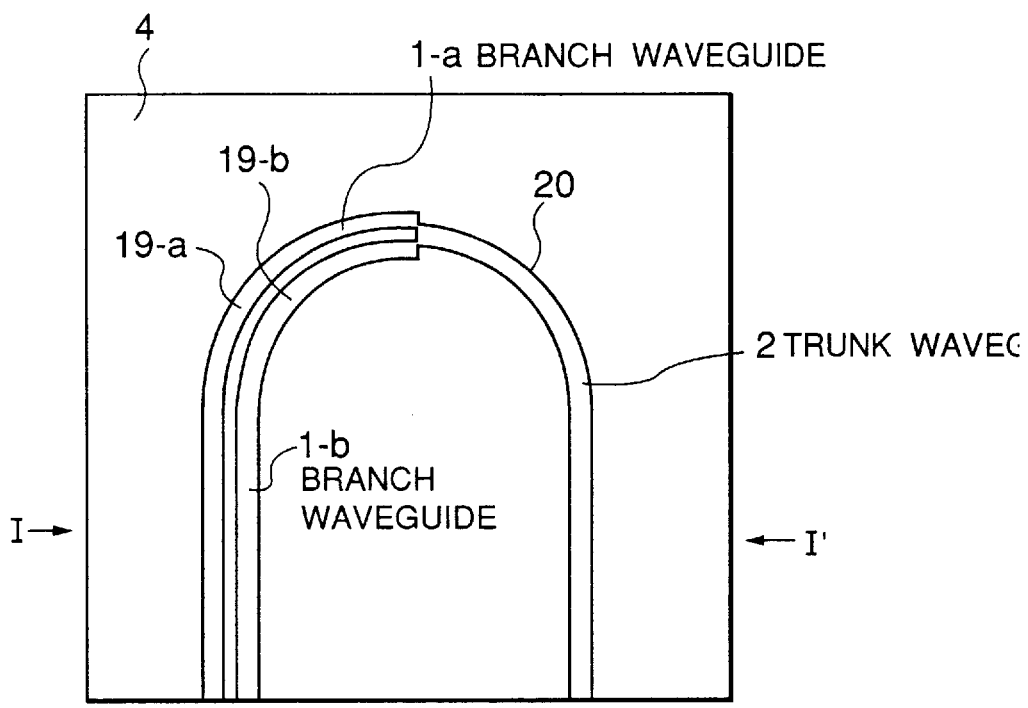
FIG. 4 shows the configuration of an optical waveguide circulator according to an embodiment of the invention.
Figure 5:
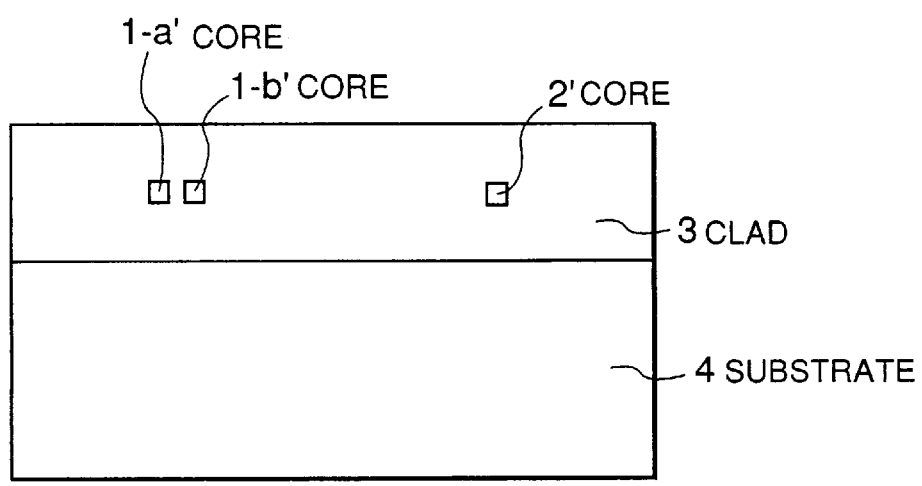
FIG. 5 is a sectional view taken along line A–A' in FIG. 4.

FIG. 4 shows the configuration of an optical waveguide circulator according to an embodiment of the invention, and FIG. 5 is a sectional view taken along line A–A' in FIG. 4.

The optical waveguide circulator of this embodiment consists of three optical waveguides formed on a substrate 4, i.e., one trunk waveguide 2 (third optical waveguide) having a curved portion and two branch waveguides 1-a and 1-b (first and second optical waveguides) having respective curved portions whose ends are connected to the trunk waveguide 2.

The branch waveguide 1-a has a curved portion 19-a and the branch waveguide 1-b has a curved portion 19-b which extends along the curved portion 19-a and is disposed inside the latter. The trunk waveguide 2 has a curved portion 20.

As seen from FIG. 4, the end of the curved portion 20 of the trunk waveguide 2 is connected to both end of the curved portions 19-a and 19-b of the two branch waveguides 1-a and 1-b. Although in FIG. 4 the two branch waveguides 1-a and 1-b are so drawn as to be close to each other, actually a certain gap is formed between those waveguides to prevent mode coupling therebetween.

Figure 6:
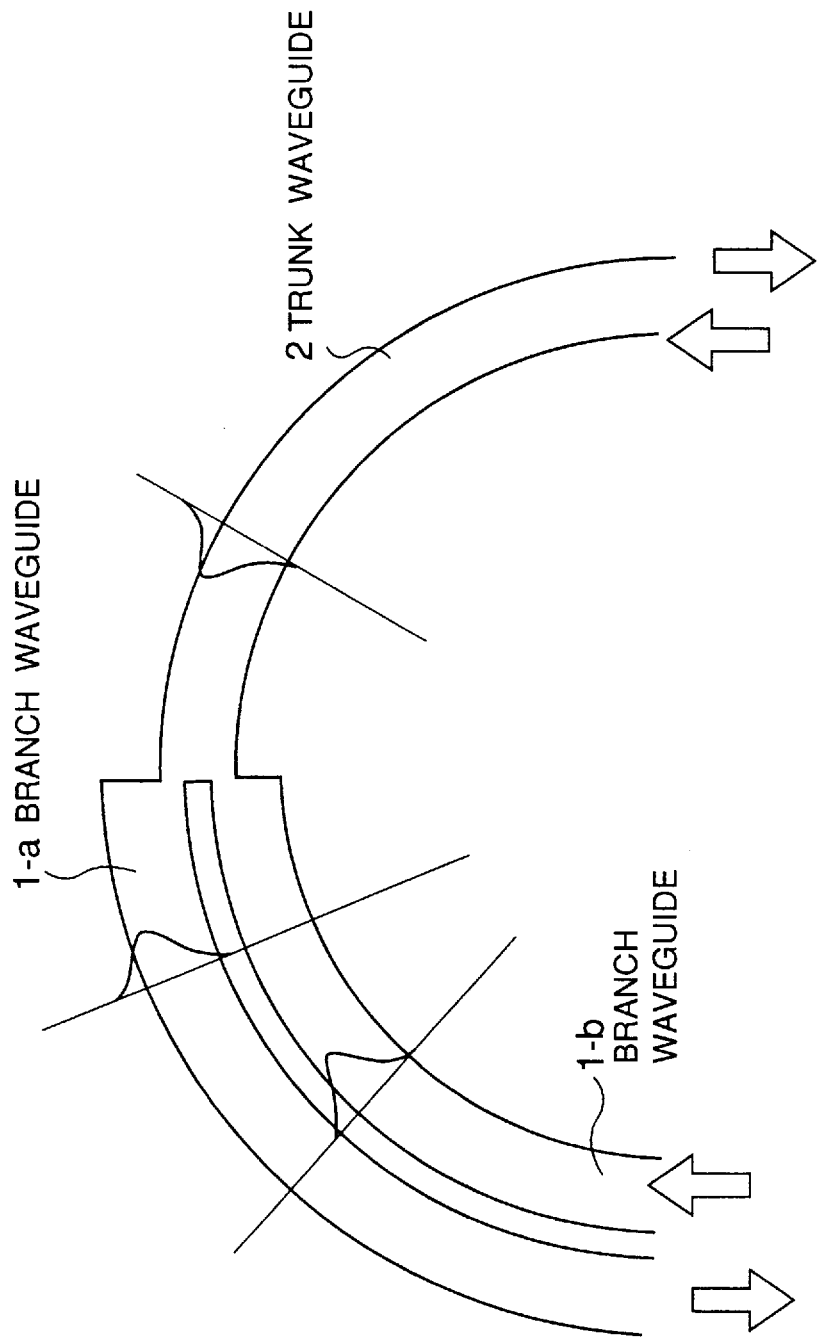
FIG. 6 is a conceptual diagram showing how the optical waveguide circulator of FIG. 4 propagates light.

Next, a description will be made of the basic principle of the above-configured optical waveguide circulator of the embodiment. FIG. 6 is a conceptual diagram showing how the optical waveguide circulator of the embodiment propagates light.

As a result of the connection of the branch waveguides 1-a and 1-b and the trunk waveguide 2, light traveling through the curved portion 19-b of the branch waveguide 1-b toward the trunk waveguide 2 reaches the connection portion in a state that the peak of the intensity profile of propagation light is deviated outside, as shown in FIG. 6. At the connection portion, the trunk waveguide 2 is offset outside with respect to the branch waveguide 19-b. Therefore, the peak position in the intensity profile of propagation light, which is deviated outside, comes close to the center of the trunk waveguide 2.

In general, the coupling efficiency of a case where a light beam traveling through one medium enters a different medium depends on the degree of overlap between an electric field profile of an exiting beam and that of a beam in the coupling destination medium. Therefore, the coupling efficiency is increased by offsetting the coupling destination medium in the direction in which the peak of the electric field profile is deviated in a curved portion. In terms of the embodiment concerned, light traveling through the branch waveguide 1-b toward the connection portion enters the trunk waveguide 2 at a high optical coupling efficiency. Similarly, light traveling through the trunk waveguide 2 toward the connection portion enters the branch waveguide 1-a at a high efficiency because the peak of the intensity profile of propagation light is deviated outside in the curved portion 20.

Conversely, in the case of light traveling through the branch waveguide 1-a toward the connection portion, since the peak of the intensity profile of propagation light is deviated outside in the curved portion and the trunk waveguide 2 is offset inside with respect to the branch waveguide 1-a, the peak position of the intensity profile of propagation light in the branch waveguide 1-a is much distant from the center of the trunk waveguide 2, resulting in a large coupling loss. The same thing applies to a case where light enters the branch waveguide 1-b from the trunk waveguide 2.

To summarize the above-described characteristics, low-loss coupling is attained for light entering the trunk waveguide 2 from the branch waveguide 1-b and light entering the branch waveguide 1-a from the branch waveguide 2. On the other hand, a large loss occurs when light enters the trunk waveguide 2 from the branch waveguide 1-a and when light enters the branch waveguide 1-b from the trunk waveguide 2. Thus, an optical circulator is realized.

Since the optical circulator of this embodiment is constructed by forming the optical waveguides 1-a, 1-b, and 2 on the same substrate, it can be manufactured by utilizing a quartz waveguide manufacturing process, for instance. One method of manufacturing a silicon oxide waveguide is a CVD method. According to this method, a highly transparent quartz film can be formed on a wafer surface by composing a quartz film chemically on a silicon wafer, for instance. Many waveguide circuits are printed at one time on the thus-composed quartz film by a photolithography technique commonly used for manufacture of semiconductor chips, to obtain a number of quartz waveguide elements.

It is difficult to reduce the size of the conventional optical circulators because they include a Faraday polarizer, an analyzer, a rutile prism, a Faraday rotator, and other components. In contrast, the optical waveguide circulator of the invention enables miniaturization because it can be formed on a thin wafer. In addition, the optical waveguide circulator of the invention is superior in mass productivity because a number of circuits can be manufactured at one time on a single wafer. The high mass productivity allows reduction in unit manufacturing cost. Needless to say, the optical waveguide circulator of the invention is more suitable for miniaturization and integration than optical circulators using bulk parts.

Again referring to FIGS. 4 and 5, a description will be made of a specific configuration of the optical waveguide circulator according to the embodiment of the invention.

As shown in FIG. 5, a clad 3 having a small refractive index is provided so as to surround cores 1-a', 1-b', and 2' having a large refractive index. A single mode operation is enabled in a wavelength range longer than 1.3 μm by adjusting the difference in refractive index between the clad and the cores and the width and height of the cores.

The cores and the clad, which are quartz glass films, are formed on a silicon substrate by CVD. They may be formed by flame hydrolysis deposition, electron beam evaporation, sputtering, and other methods. Further, any substrate materials other than silicon, including quartz and ceramics, may be used as long as they can withstand CVD.

The branch waveguide 1-a is connected to the trunk waveguide 2 such that the center line of the former is offset outside with respect to that of the latter, while the branch waveguide 1-*b* is connected to the trunk waveguide such that the center line of the former is offset inside with respect to that of the latter.

The radii of curvature of the center lines of the waveguides are set depending on the difference in refractive index between the clad and the cores, i.e., Δn, and the cross-sectional dimensions of the cores. If the radius of curvature of a waveguide is too large, light is radiated from the side faces of the waveguide to cause a loss. Conversely, if it is too small, the electric field profile of light traveling through the waveguide is excessively concentrated in a region close to the center, in which case it becomes difficult to attain the intended function of an optical circulator.

The resistance to bending loss depends on Δn and the cross-sectional dimensions of the cores. To attain a single mode operation of guided light, Δn is set at 0.3 to 1 and the cross-sectional dimensions of the cores are set at 4 μm×4 μm to 8 μm×8 μm. If Δn is too small, the confinement of the electric field profile into the core becomes insufficient to increase the bending loss. Therefore, a suitable range of the radius of curvature is approximately 1 mm to 15 mm. It is noted that in this embodiment the width of the waveguides are set at 8 μm.

Figure 7:
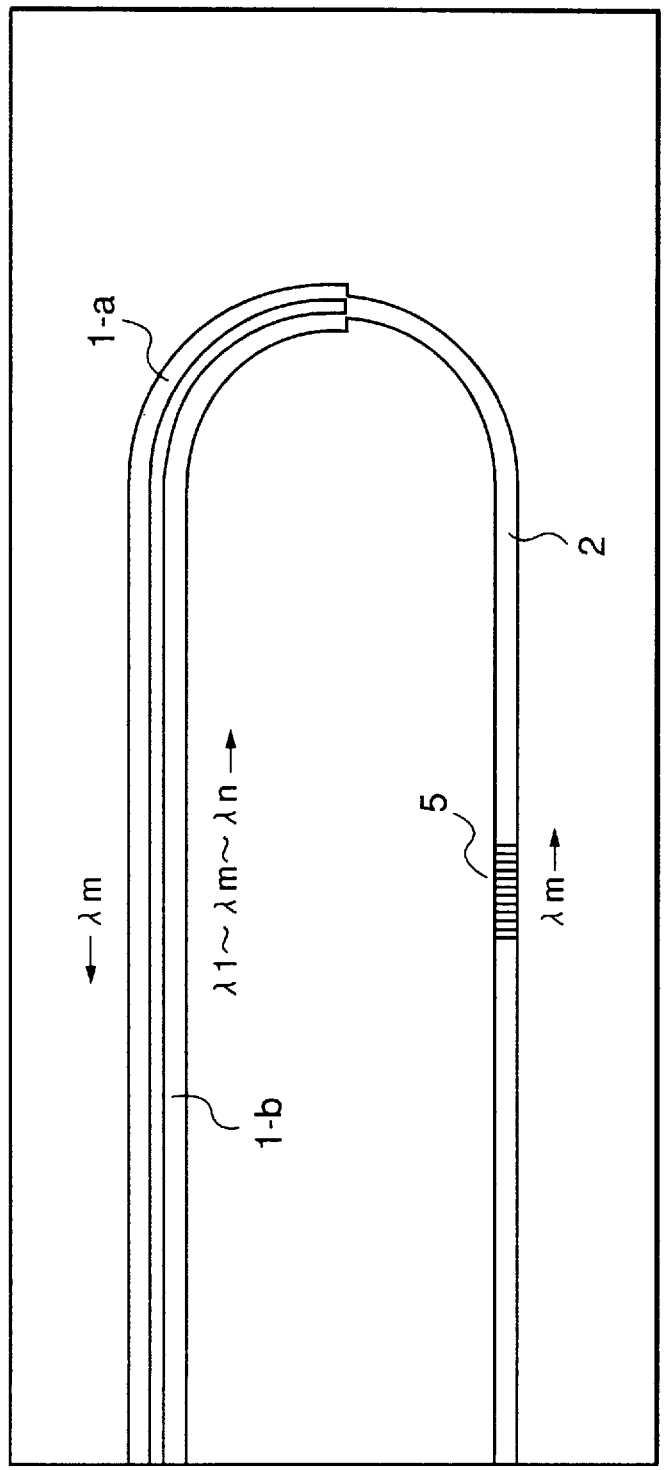
FIG. 7 shows the configuration of an embodiment in which the optical waveguide circulator of the invention is combined with an optical bandpass filter.

Next, another embodiment will be described which utilizes the optical waveguide circulator of the invention. FIG. 7 shows the configuration of an optical circuit in which an optical waveguide circulator of the invention and a waveguide filter are combined on the same substrate.

A single mode operation in a wavelength range of 1.55 μm is established by adjusting the core/clad refractive index difference at 0.75% and the width and height of the cores at 6 μm. The cores and the clad are silicon oxide glass films formed on a silicon substrate by CVD.

The waveguide circuit is so constructed that curved portions of two waveguides, i.e., branch waveguides 1-*a* and 1-*b*, are connected to a curved portion of a trunk waveguide 2.

The branch waveguide 1-*a* is connected to the trunk waveguide 2 such that the center line of the former is offset outside with respect to the center line of the latter. The branch waveguide 1-*b* is connected to the trunk waveguide 2 such that the center line of the former is offset inside with respect to the center line of the latter.

In this embodiment, the width of the waveguides 1-*a*, 1-*b*, and 2 is set at 8 μm and the gap between the branch waveguides 1-*a* and 1-*b* is set at 4 μm.

As a result of the above-mentioned connection between the trunk waveguide 2 and the branch waveguides 1-*a* and 1-*b*, light traveling through the branch waveguide 1-*b* toward the trunk waveguide 2 reaches the connection portion in a state that the peak of the intensity profile of propagation light is deviated outside in the curved portion. Since the trunk waveguide 2 is offset outside with respect to the branch waveguide 1-*b* at the connection portion, the peak position of the intensity profile of propagation light comes close to the center of trunk waveguide 2. As a result, light traveling through the branch waveguide 1-*b* enters the trunk waveguide 2 at a high optical coupling efficiency. Similarly, light traveling through the trunk waveguide 2 toward the connection portion enters the branch waveguide 1-*a* at a high efficiency because the peak of the intensity profile of propagation light is deviated outside in the curved portion.

Conversely, in the case of light traveling through the branch waveguide 1-*a* toward the connection portion, since the peak of the intensity profile of propagation light is deviated outside in the curved portion and the trunk waveguide 2 is offset inside with respect to the branch waveguide 1-*a*, the peak position of the intensity profile of propagation light in the branch waveguide 1-*a* is much distant from the center of the trunk waveguide 2, resulting in a large coupling loss. The same thing applies to a case where light enters the branch waveguide 1-*b* from the trunk waveguide 2.

To summarize the above-described characteristics, low-loss coupling is attained for light entering the trunk waveguide 2 from the branch waveguide 1-*b* and light entering the branch waveguide 1-*a* from the branch waveguide 2. On the other hand, a large loss occurs when light enters the trunk waveguide 2 from the branch waveguide 1-*a* and when light enters the branch waveguide 1-*b* from the trunk waveguide 2. Thus, the function of an optical circulator is realized.

Referring to FIG. 7, an end portion of the trunk waveguide 2 is processed into a grating 5, so that the refractive index varies periodically there. Phosphorus-doped silicon oxide glass and cerium-doped silicon oxide glass exhibit photosensitivity. Although the photosensitivity of germanium-doped silicon oxide glass is weak, there is known a paper showing that it can be enhanced by hydrogen loading or illumination with a large amount of ultraviolet light. The grating 5 can be formed even in a silicon oxide optical waveguide by the above method.

By forming the grating 5 by the above processing, it becomes possible to reflect light having a desired wavelength $\lambda_m$. The grating 5 can be used as an optical bandpass filter when combined with the optical circulator of the invention.

Figure 8:
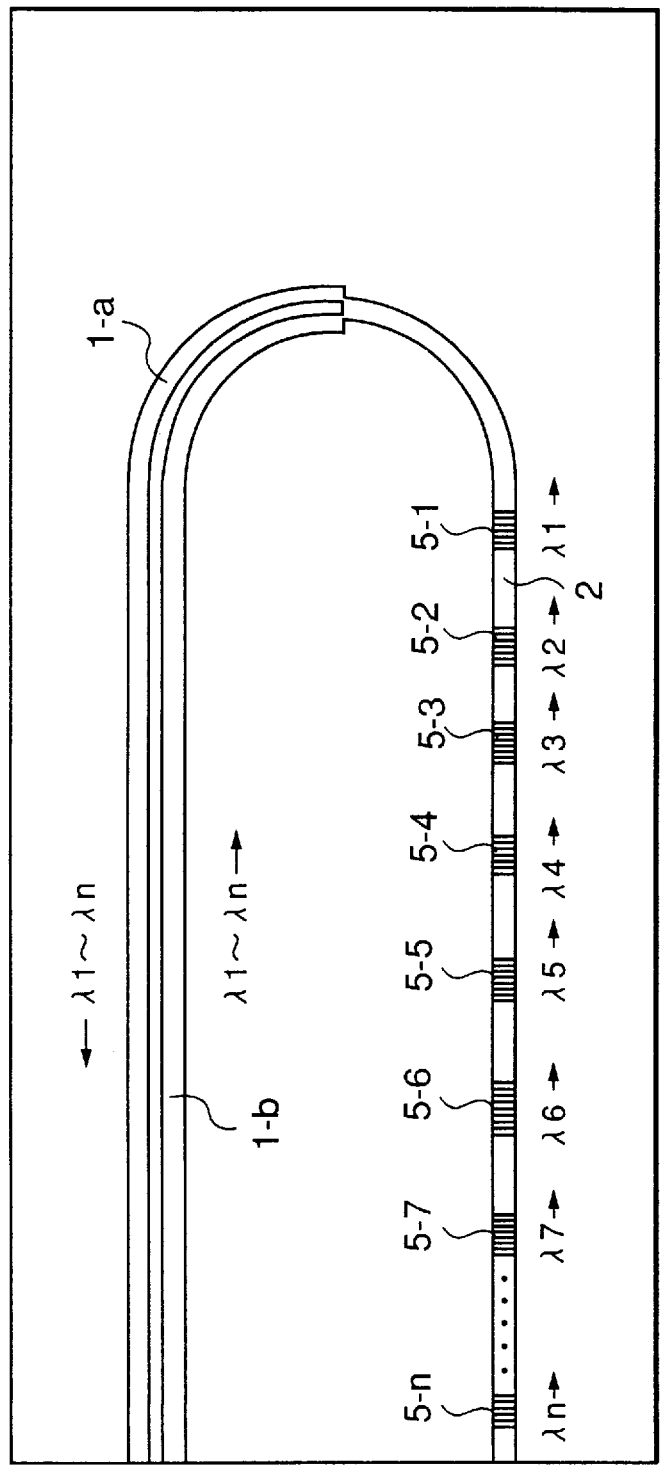
FIG. 8 shows the configuration of an embodiment in which the optical waveguide circulator of the invention is combined with an optical dispersion compensator.

FIG. 8 shows a further embodiment of the invention in which a plurality of gratings 5-1 to 5-*n* similar to the grating 5 of FIG. 7 but having varied pitches are connected in series at certain intervals. With this configuration, different delay times are obtained for wavelengths $\lambda_1$ to $\lambda_n$ of light to be reflected. That is, reflected light is given a delay time that depends on its wavelength, which means wavelength dispersion.

By combining this dispersion compensator, a dispersion compensator having a low insertion loss can be realized which prevents light from returning to the input side.

As described above, according to the optical waveguide circulator of the invention, an optical circulator is constructed by optical waveguides by utilizing the characteristics of guided light traveling through a curved waveguide. Therefore, the optical waveguide circulator of the invention is suitable for miniaturization and integration. Unlike conventional optical circulators, the optical waveguide circulator of the invention requires neither expensive individual parts such as an isolator and a Y branching device nor connections among individual parts. Therefore, the optical waveguide circulator of the invention is also suitable for mass production.

While this invention has been described in connection with certain preferred embodiments, it is to be understood that the subject matter encompassed by way of this invention is not to be limited to those specific embodiments. On the contrary, it is intended for the subject matter of the invention to include all alternative, modification, and equivalents as can be included within the spirit and scope of the following claims.

What is claimed is:

1. An optical waveguide circulator comprising:

a first optical waveguide having a first curved portion;

a second optical waveguide having a second curved portion that extends along and is disposed inside the first curved portion;

a third optical waveguide having a third curved portion, an end portion of the third curved portion being connected to an end portion of both the first and second curved portions;

light output means disposed at an end portion of the first optical waveguide which is opposite the end portion of the first curved portion, for receiving light outputted from the first optical waveguide;

light input means disposed at an end portion of the second optical waveguide which is opposite the end portion of the second curved portion, for introducing light into the second optical waveguide;

light input/output means disposed at an end portion of the third optical waveguide which is opposite to the end portion of the third curved portion, for introducing light into the third optical waveguide and for receiving light outputted from the third optical waveguide.

2. The optical waveguide circulator according to claim 1, wherein the first, second, and third optical waveguides are disposed on a same substrate.

3. The optical waveguide circulator according to claim 2, wherein the first and third curved portions are curved to a same side.

4. The optical waveguide circulator according to claim 3, wherein the substrate is a silicon substrate, and the first, second, and third optical waveguides are quartz waveguides.

5. The optical waveguide circulator according to claim 2, further comprising an optical filter disposed on the substrate.

6. The optical waveguide circulator according to claim 5, wherein the optical filter comprises a grating formed in the third optical waveguide.

7. The optical waveguide circulator according to claim 2, further comprising a dispersion compensator disposed on the substrate.

8. The optical waveguide circulator according to claim 7, wherein the dispersion compensator comprises a plurality of gratings formed in the third optical waveguide.

* * * * *